Figure 1:
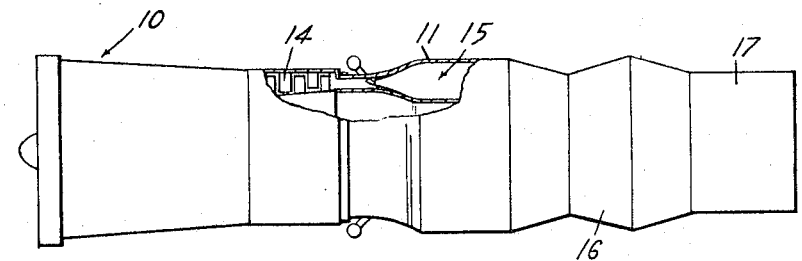

Feb. 14, 1967  H. MOXON ETAL  3,303,644
COMBUSTION EQUIPMENT FOR A GAS TURBINE ENGINE
Filed April 6, 1966  3 Sheets-Sheet 1

Inventors
HARRY MOXON
TERENCE DURRANT
By
Cushman, Darby & Cushman
Attorneys

Feb. 14, 1967    H. MOXON ETAL    3,303,644
COMBUSTION EQUIPMENT FOR A GAS TURBINE ENGINE
Filed April 6, 1966    3 Sheets-Sheet 2
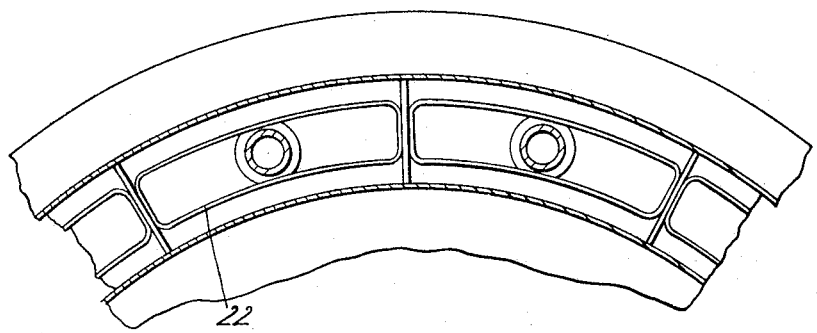
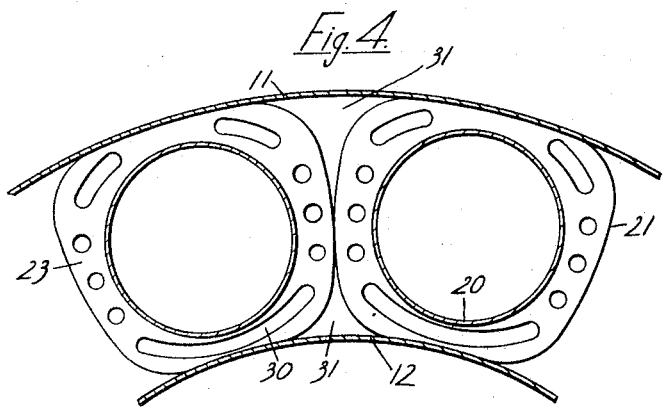
Inventors
HARRY MOXON
TERENCE DURRANT
By
Cushman, Darby & Cushman
Attorneys Feb. 14, 1967  H. MOXON ETAL  3,303,644
COMBUSTION EQUIPMENT FOR A GAS TURBINE ENGINE
Filed April 6, 1966  3 Sheets-Sheet 3
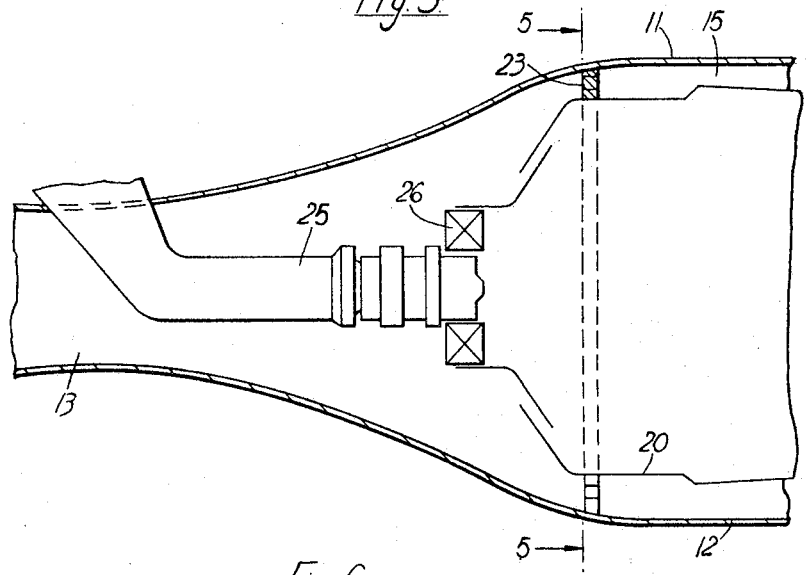
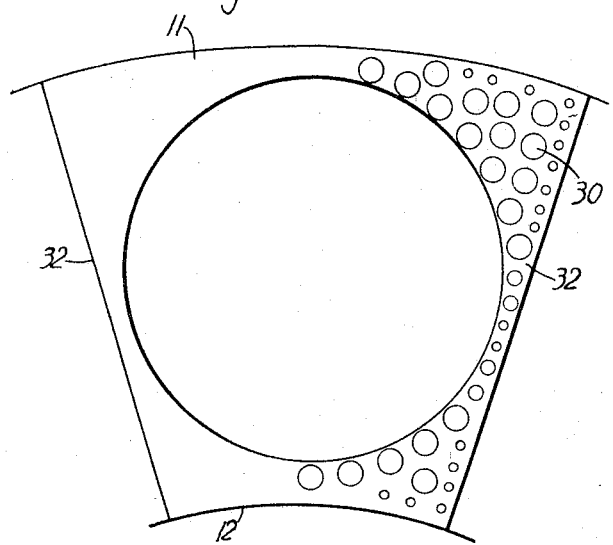
Inventors
HARRY MOXON
TERENCE DURRANT
By
Cushman, Darby & Cushman
Attorneys

United States Patent Office 3,303,644
Patented Feb. 14, 1967

3,303,644
COMBUSTION EQUIPMENT FOR A GAS
TURBINE ENGINE
Harry Moxon and Terence Durrant, both of Derby, England, assignors to Rolls-Royce Limited, Derby, England, a British company
Filed Apr. 6, 1966, Ser. No. 540,636
Claims priority, application Great Britain, Dec. 4, 1963, 47,997/63; Oct. 6, 1965, 42,467/65
9 Claims. (Cl. 60—39.37)

This invention, which concerns combustion equipment for a gas turbine engine, is a continuation-in-part of our application Serial No. 410,481 filed November 12, 1964, now abandoned.

By reason of factors such as boundary layer effects, the pressure and hence the velocity of the compressed air passing through the various different parts of the flame tubes of gas turbine engine combustion equipment has not hitherto been constant. This is obviously a very undesirable state of affairs since it may lead to overheating of the said combustion equipment and of associated engine components.

According, therefore, to the present invention, there is provided combustion equipment for a gas turbine engine comprising an outer and an inner casing defining a smoothly diverging annular space therebetween which is adapted to be supplied with compressed air from the engine compressor, an apertured plate abutting the outer and inner casings, at least one flame tube which is spaced from said outer and inner casings and mounted adjacent its upstream end in the apertured plate, the plate extending radially outwardly of said at least one flame tube to a substantial extent, whereby all the air passing through said apertures so as to flow outwardly of said at least one flame tube on all sides thereof will be at substantially the same pressure.

Preferably each said apertured plate prevents flow through said annular space except through the apertures therein, whereby all the air passing through the said apertures so as to flow outwardly of the flame tube will be at substantially same pressure.

Preferably there are a plurality of angularly spaced apart flame tubes. Each flame tube may be mounted in a sector-shaped apertured plate, the said plates lying in a common radial plane and abutting each other.

The apertures in each said plate may be of differing sizes.

Preferably, the upstream end of each flame tube is mounted within the downstream end of a hollow casing member whose upstream end is adapted to be supplied with compressed air from the engine compressor, the apertured plate in which the flame tube is mounted forming the downstream end of the hollow casing member.

Each hollow casing member may be substantially smaller in radial extent at its upstream than at its downstream end.

Preferably, adjacent hollow casing members and the outer and inner casings define spaces therebetween through which some of the air passes.

Each casing member is preferably of substantially constant extent angularly from its upstream to its downstream end.

The upstream end of each flame tube may be supplied with fuel from a fuel inlet pipe which passes through the upstream end of the respective casing member.

The invention also comprises a gas turbine engine provided with combustion equipment as set forth above.

Figure 2:
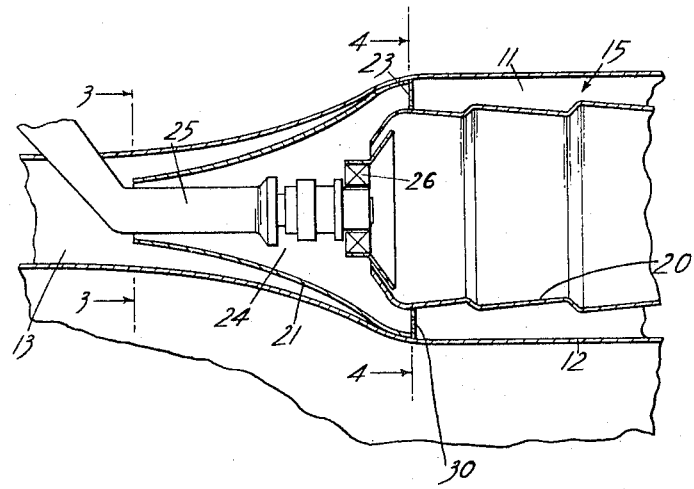

The invention is illustrated, merely by way of example, in the accompanying drawings, in which:

FIGURE 1 is a part-sectional diagrammatic representation of a gas turbine engine provided with combustion equipment according to the present invention, FIGURE 2 is a broken-away sectional view of part of the gas turbine engine as shown in FIGURE 1, FIGURES 3 and 4 are sections taken respectively on the line 3—3 and 4—4 of FIGURE 2, FIGURE 5 is a sectional diagrammatic view corresponding to FIGURE 2, but illustrating a modification, and FIGURE 6 is a sectional view taken on the line 5—5 of FIGURE 5.

Referring first to FIGURES 1 to 4 of the drawings, a gas turbine engine 10 comprising in flow series a compressor 14, an annular flow duct 13 defined by an outer casing 11 and an inner casing 12, combustion equipment 15 disposed within the said duct 13 and a turbine 16, the turbine exhaust gases being directed to atmosphere through a jet pipe 17.

The combustion equipment 15 comprises a plurality of angularly spaced apart flame tubes 20 each of which is mounted in the annular flow duct 13 and is spaced from the outer and inner casings 11, 12.

The upstream end of each of the flame tubes 20 is mounted within the downstream end of a hollow casing member 21. The upstream ends of the casing members 21 are adapted to be supplied with compressed air from the compressor 14.

Each of the casing members 21 has at its upstream end an opening 22 and has at its downstream end a plate 23, the radial extent of the opening 22 being substantially smaller than that of the plate 23. Each casing member 21 is, however, of substantially constant extent angularly from its upstream to its downstream end.

The interior of each casing member 21 forms a plenum chamber 24 which assists the equalisation of pressure differences in the compressed air in different parts thereof. Accordingly, the air passing through all the parts of the upstream ends of the flame tubes 20 is at approximately the same pressure.

The upstream end of each flame tube 20 is supplied with fuel from a fuel inlet pipe 25 which passes through the upstream end of the respective casing member 21, the downstream end of each fuel inlet pipe 25 being mounted within swirl vanes 26 through which air from the plenum chamber 24 enters the upstream end of the respective flame tube 20.

The plate 23 at the downstream end of each of the casing members 21 is provided with a plurality of apertures 30 (best seen in FIGURE 4) these apertures 30 being of varying size. As will be seen from FIGURE 4, the plate 23 abuts the outer and inner casings 11, 12 and extends outwardly of the respective flame tube 20 to a substantial extent. Accordingly, all the air passing from the plenum chamber 24 and through the apertures 30 so as to flow outwardly of the respective flame tube 20 on all sides thereof will be at approximately the same pressure.

A small proportion of the compressed air supplied by the compressor 14 passes through the spaces 31 between the adjacent plates 23 and the outer and inner casings 11, 12. The amount of air passing through the spaces 31 is, however, so small that it does not materially affect the distribution of air for combustion.

Referring now to FIGURES 5 and 6, there is shown a modification of the invention. In this embodiment of the invention good control of the air flow round the flame tubes may be obtained with the hollow casing member 21 of FIGURES 1 to 4 removed but with the spaces 31 between adjacent plates closed to air flow. This arrangement has the advantages of reduced weight and simpler construction.

As in the embodiment of FIGURES 1 to 4, there is provided adjacent the upstream end of each flame tube 20 a plate 23 lying in a substantially radial plane each plate 23 being formed with a plurality of apertures 30.

The arrangement of the apertures 30 which are of varying size is designed to be such as to produce a good velocity distribution of air passing therethrough which remains substantially insensitive to changes in the compressor delivery and in which pressure losses are kept to a minimum.

Each plate 23 is of a shape which conforms to the outline of and abuts the outer and inner casings 11 and 12. Each flame tube 20 is mounted in and surrounded in abutting relationship by a plate 23.

The side edges 32 of each plate 23 extend fully in the radial direction between the outer and inner casings 11 and 12. The side edges 32 are so formed that adjacent plates 23 provide a good fit whereby the annular flow duct 13 is completely filled in the radial plane in which the plates 23 lie. In a preferred solution, each plate 23 is sector-shaped, the side edges 32 being straight radial lines.

It will be appreciated that the invention of the FIGURE 5-6 embodiment is applicable to both annular and tubo-annular combustion systems.

We claim:

1. Combustion equipment for a gas turbine engine comprising an outer and an inner casing defining a smoothly diverging annular space therebetween which is adapted to be supplied with compressed air from the engine compressor, an apertured plate abutting the outer and inner casings, at least one flame tube which is spaced from said outer and inner casings and mounted adjacent its upstream end in the apertured plate, the plate extending radially outwardly of said at least one flame tube to a substantial extent whereby all the air passing through said apertures so as to flow outwardly of said at least one flame tube on all sides thereof will be at substantially the same pressure.

2. Combustion equipment for a gas turbine engine comprising an outer and an inner casing defining an annular space therebetween which is adapted to be supplied with compressed air from the engine compressor, and at least one flame tube which is mounted in said annular space and spaced from said outer and inner casings, said at least one flame tube being mounted, adjacent its upstream end, in an apertured plate which lies in a radial plane and extends to the inner and outer casings, each said apertured plate preventing flow through said annular space except through the apertures therein, whereby all the air passing through the said apertures so as to flow outwardly of the flame tube will be at substantially the same pressure.

3. Combustion equipment as claimed in claim 1 in which there are a plurality of angularly spaced apart flame tubes.

4. Combustion equipment as claimed in claim 3 in which each flame tube is mounted in a sector-shaped apertured plate, the said plates lying in a common radial plane and abutting each other.

5. Combustion equipment as claimed in claim 1 in which the apertures in each said plate are of differing sizes.

6. Combustion equipment for a gas turbine engine comprising an outer and an inner casing with an annular space therebetween, a plurality of angularly spaced apart flame tubes each of which is mounted in said annular space and spaced from said outer and inner casings, a hollow casing member for each flame tube, the upstream end of each flame tube being mounted within the downstream end of the respective casing member whose upstream end is adapted to be supplied with compressed air from the engine compressor, means forming the interior of each casing member into a plenum chamber in which pressure differences in the compressed air in different parts thereof are equalised, and an apertured plate mounted at the downstream end of each casing member, the plate abutting the inner and outer casings and extending outwardly of the respective flame tube to a substantial extent, whereby all the air passing from the plenum chamber and through said apertures so as to flow outwardly of the flame tube on all sides thereof will be at substantially the same pressure.

7. Combustion equipment for a gas turbine engine comprising an outer and an inner casing with an annular space therebetween, a plurality of angularly spaced apart flame tubes each of which is mounted in said annular space and spaced from said outer and inner casings, a hollow casing member for each flame tube, each casing member being substantially smaller in radial extent at its upstream than at its downstream end, the upstream end of each flame tube being mounted within the downstream end of the respective casing member whose upstream end is adapted to be supplied with compressed air from the engine compressor, means forming the interior of each casing member into a plenum chamber in which pressure differences in the compressed air in different parts thereof are equalised, and an apertured plate mounted at the downstream end of each casing member, the plate abutting the inner and outer casings and extending outwardly of the respective flame tube to a substantial extent, whereby all the air passing from the plenum chamber and through said apertures so as to flow outwardly of the flame tube on all sides thereof will be at substantially the same pressure.

8. Combustion equipment for a gas turbine engine comprising an outer and an inner casing with an annular space therebetween, a plurality of angularly spaced apart flame tubes each of which is mounted in said annular space and spaced from said outer and inner casings, a hollow casing member for each flame tube, each casing member being substantially smaller in radial extent at its upstream than at its downstream end, and each casing member being of substantially constant extent angularly from its upstream to its downstream end, the upstream end of each flame tube being mounted within the downstream end of the respective casing member whose upstream end is adapted to be supplied with compressed air from the engine compressor, means forming the interior of each casing member into a plenum chamber in which pressure differences in the compressed air in different parts thereof are equalised, and an apertured plate mounted at the downstream end of each casing member, the plate abutting the inner and outer casings and extending outwardly of the respective flame tube to a substantial extent, whereby all the air passing from the plenum chamber and through said apertures so as to flow outwardly of the flame tube on all sides thereof will be at substantially the same pressure.

9. Combustion equipment for a gas turbine engine comprising an outer and an inner casing with an annular space therebetween, a plurality of angularly spaced apart flame tubes each of which is mounted in said annular space and spaced from said outer and inner casings, a hollow casing member for each flame tube, the upstream end of each flame tube being mounted within the downstream end of the respective casing member whose upstream end is adapted to be supplied with compressed air from the engine compressor, a fuel inlet pipe which is mounted in the upstream end of each flame tube and which passes through the upstream end of the respective casing member, means forming the interior of each casing member into a plenum chamber in which pressure differences in the compressed air in different parts thereof are equalised, and an apertured plate mounted at the downstream end of each casing member, the plate abutting the inner and outer casings and extending outwardly of the respective flame tube to a substantial extent, whereby all the air passing from the plenum chamber and through said apertures so as to flow outwardly of the flame tube on all sides thereof will be at substantially the same pressure.

References Cited by the Examiner

UNITED STATES PATENTS 2,720,080  10/1955  Oulianoff _____ 60—39.65 X

FOREIGN PATENTS 686,383  1/1953  Great Britain.

MARK NEWMAN, *Primary Examiner.*

R. D. BLAKESLEE, *Assistant Examiner.*